A. GRAHAM.
ELECTRICAL IGNITION FOR INTERNAL COMBUSTION ENGINES.
APPLICATION FILED MAR. 1, 1915.

1,253,587.   Patented Jan. 15, 1918.

Witnesses:
James Heskett
Jane Witham

Inventor:
Arthur Graham

UNITED STATES PATENT OFFICE.

ARTHUR GRAHAM, OF NEW YORK, N. Y.

ELECTRICAL IGNITION FOR INTERNAL-COMBUSTION ENGINES.

1,253,587.  Specification of Letters Patent.  Patented Jan. 15, 1918.

Application filed March 1, 1915. Serial No. 11,274.

*To all whom it may concern:*

Be it known that I, ARTHUR GRAHAM, a citizen of England, residing in the city, county, and State of New York, have invented certain new and useful Improvements in Electrical Ignitions for Internal-Combustion Engines.

My invention relates to apparatus for the production of electric discharges or sparks for any purpose, but especially for the ignition of explosive mixture in internal combustion engines.

The object of my invention is to increase the volume and duration of the spark of any high tension source of electric current.

Figure 1:
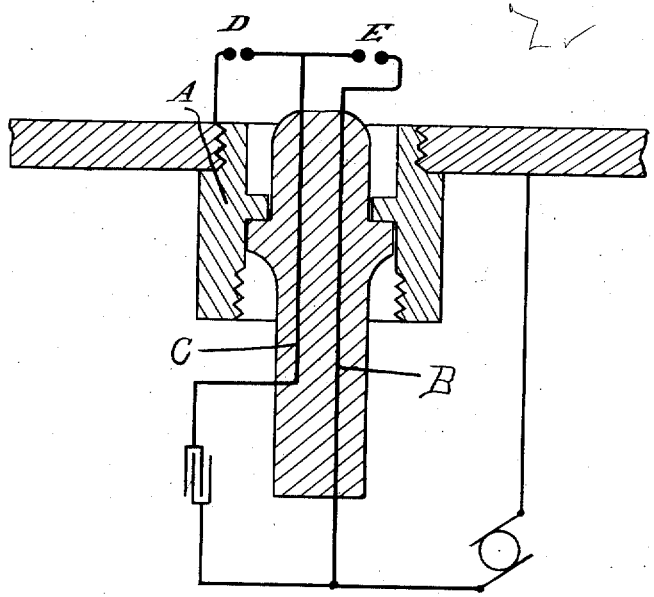
Figure 1 is a diagrammatic view of a spark plug, with circuits arranged according to the principles of my invention.

Referring to the drawing A is the metal body of a spark plug, screw threaded to fit the customary opening in the cylinder and to which one terminal of the secondary of an induction coil is electrically connected, B an electrode leading to the distributer and to the remaining terminal of the secondary, C an electrode to which is connected one terminal of an electrical condenser, the remaining terminal of the condenser being preferably connected to the electrode B, the electrodes B and C being of course insulated from each other and from the metal body A.

Figure 2:
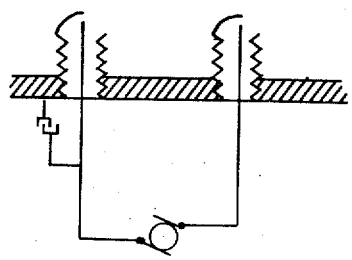
Fig. 2 represents two spark plugs in same combustion chamber, one spark gap being shunted by an electrical condenser.

Fig. 2, shows two spark plugs in same combustion chamber, and an electrical condenser one pole of which is connected to one terminal of one spark plug and the remaining pole of the condenser connected to the remaining terminal of same spark plug.

Figure 3:
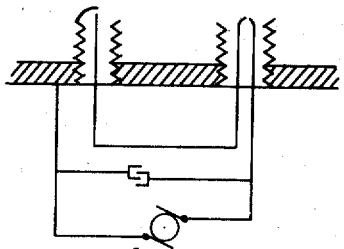
Fig. 3 represents two spark plugs in same combustion chamber and an electrical condenser connected across the electric source.

Fig. 3 shows two spark plugs in same combustion chamber and an electrical condenser one pole of which is connected to one pole of the electric source and the remaining pole of the condenser to the opposite pole of the electric source.

It is well known that if an electrical condenser of suitable capacity is connected in series with a spark gap in a high tension circuit, the resulting spark will be precisely the same as if no condenser was in circuit. I take advantage of this fact by placing a spark gap around the condenser, thus utilizing the discharge of the condenser to produce a second spark at the gap surrounding the condenser; the action is as follows, referring to the drawing and supposing a condenser is connected between B and C. The moment the spark jumps the gap at D, the condenser is charged and immediately discharges across the gap at E, thus forming one continuous spark, having twice the volume and double the duration of that produced by any existing system.

It is obvious that this method would apply to the use of two ordinary spark plugs located in the same cylinder.

I may in certain cases dispense with the condenser using the two spark gaps connected in series. In this case the electrode B extending through the plug provides surface which helps to radiate the heat produced at the terminal by the spark, as well as providing a certain amount of electrostatic capacity, which materially assists the electric source in overcoming the resistance at the spark gaps and thus producing a greater volume of spark, or I may use with such a plug an electrical condenser connected directly across the high tension source, thus producing oscillating discharges at both spark gaps. I however prefer to use a separate condenser for each spark plug the terminals of the condenser being preferably connected to the conductors represented in the drawing by C and B.

I do not limit myself to any special connection of the condenser nor to any special design of condenser.

I claim:

1. In a system of electrical ignition a spark plug having two electrodes passing through the core of said plug, insulated from each other and from the metal shell of said plug, the terminals of the two insulated electrodes being arranged in close proximity to each other in the combustion chamber, and one of said electrodes being also arranged in close proximity to an electrode electrically connected to the metal shell of said plug, thus forming two spark gaps connected in series with an electric source, and an electrical condenser one pole of which is electrically connected to an electrode forming one side of one spark gap, and the remaining pole of the condenser being electrically connected to the electrode forming the other side of same spark gap.

2. In a system of electrical ignition a plurality of spark gaps connected in series in a combustion chamber, and having the electrical source terminals bridged by an electrical condenser.

3. In a system of electric ignition, two spark plugs arranged in a combustion chamber of an internal combustion engine, and connected in series with an electric source, thus forming two spark gaps also in series with the electric source, an electrical condenser, one pole of which is electrically connected to an electrode forming one side of a spark gap and the remaining pole of the condenser being electrically connected to the electrode forming the other side of same spark gap.

4. An electric ignition system having two spark plugs arranged in a combustion chamber of an internal combustion engine, and forming two spark gaps connected in series with an electric source, an electrical condenser, one pole of which is electrically connected to the electrode of one spark plug which leads to one terminal of the electric source and the remaining pole of the condenser being electrically connected to the electrode of the other spark plug which leads to the remaining terminal of the electric source the condenser being connected in shunt circuit with both spark gaps.

5. In an electrical ignition system a spark plug consisting of a metal shell an insulating core within said shell, two electrical conductors passing through said core, insulated from each other and from the metal shell of said plug, each conductor having outside terminals for the purpose of connecting to one side of a high tension electric source, so that either one or two sparks may be produced in the combustion chamber as desired.

ARTHUR GRAHAM.

Witnesses:
JAMES HESKETT,
JANE WITHAM.